Aug. 19, 1952

C. BOSCH 2,607,233

PRESSURE TIGHT TRANSMISSION

Filed May 19, 1949

INVENTOR.

*Curt Bosch*

Patented Aug. 19, 1952

2,607,233

UNITED STATES PATENT OFFICE 2,607,233

PRESSURETIGHT TRANSMISSION

Carl Bosch, Arlington, N. J., assignor to Chatham Electronics Corporation, Newark, N. J., a corporation of New Jersey Application May 19, 1949, Serial No. 94,218

2 Claims. (Cl. 74—18.1)

This invention relates to mechanical transmission devices for transferring mechanical power from a region of one pressure to a volume having another pressure without the possibility of leakage.

While the device is termed a pressuretight transmission it is to be understood that a vacuum chamber can also be used to house and receive the transmitted rotary power.

Many pressure holding bearings have been designed and used in the past. These have generally comprised a rotary shaft with ridges and grooves acting in conjunction with stationary flexible bearings having similar shape. Some of the prior art bearings used some form of liquid as a means of stopping gas leakage. Usually the bearings worked well when new but always developed leaks after considerable usage.

The present invention features a transmission which uses ball or roller bearings and does not depend upon them for pressuretightness.

The invention includes a pressuretight transmission which comprises a journalled shaft, one portion of which is bent out of line with the axis of rotation. A pressuretight flexible covering encloses the bent portion of the shaft and constitutes part of the barrier between the gas in the enclosure and the atmosphere. The flexible covering is sealed at each end, one seal secured to the wall of the enclosure and the other end sealed to a cap which covers the end of the shaft. Driving means are applied to the cap to rotate it in a direction around the axis of the journalled shaft.

One of the objects of the invention is to provide a pressuretight transmission which precludes the leakage of gas through the transmission structure.

Another object of the invention is to reduce the friction necessary to drive the transmitting shaft.

Still another object of the invention is to provide a simplified and inexpensive rotary transmission which is easy to assemble and maintain.

For a better understanding of the present invention, together with other and further objects thereof, reference is made to the following description taken in connection with the accompanying drawings.

Figure 1:
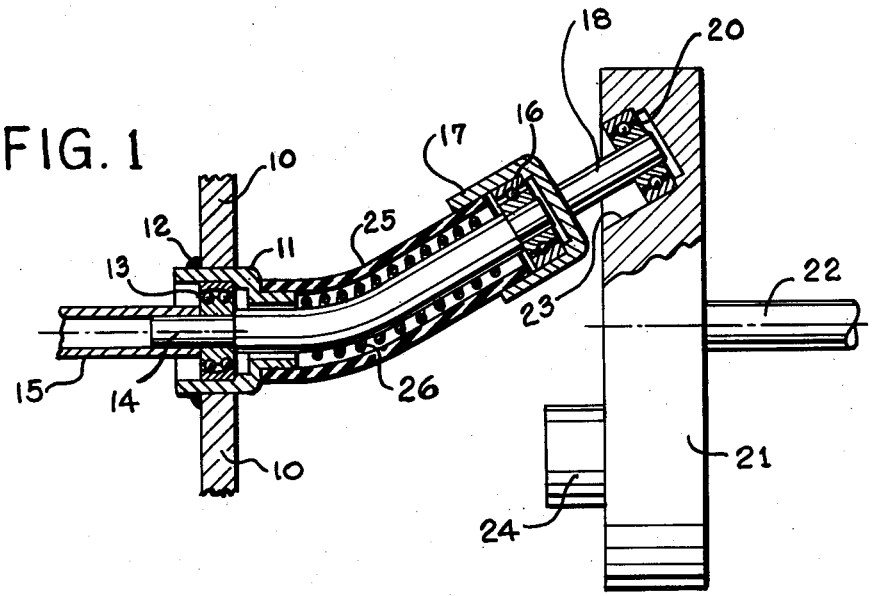
Fig. 1 is a side view, generally in section, showing the transmission in its simplest form.

Referring now to Fig. 1 a wall 10 is part of an enclosure which contains a gas having a different pressure than the atmosphere. A bearing support 11 is secured to a hole in the wall and a pressuretight seal is effected by means of a soldering or welding bead 12. On the inside surface a ball bearing 13 may be mounted although such a bearing is not necessary to the operation of the transmission.

A shaft 14 which transmits power from the outside of the enclosure to the inside is journalled in the ball bearing and is coupled to a driven member 15 which may rotate any desired members or devices within the enclosure.

Beyond the limits of the enclosure the shaft 14 is bent in a smooth curve until it makes an appreciable angle (about 30°) with the axis of the bearing. Such a curve produces a simplified crank and the application of a rotary force on the bent end of the shaft will tend to turn the shaft in the bearing 13. A second bearing 16 is secured to the end of the bent shaft and a pressure tight cap 17 is mounted to the outside race of the bearing. The cap 17 is provided with a concentric stub shaft 18 which is also mounted in a bearing 20.

A driving wheel 21 is secured to a driving shaft 22 mounted in axial alignment with the bearing 13 and the driven member 15. The bearing 20 is fitted into a cavity 23 cut in the face of the driving wheel at an angle which is equivalent to the angle of the bent shaft 14. On the driving wheel 21 a balancing weight 24 may be secured although this is not necessary unless the device rotates at very high speed.

To make the transmission pressuretight a flexible tube 25, which may be made of rubber, is mounted so as to enclose the exposed portions of the bent shaft 14. At one end the rubber tube is sealed to a bent in portion of the bearing support 11 and at the other end the flexible tube is sealed to some portion of the cap 17. This construction provides a complete sealed enclosure eliminating all sources of seepage, and as long as all sealed joints are tight no gas from the enclosure may escape to the atmosphere.

It has been found by experiment that a simple flexible tube 25 enclosing the bent shaft 14 will not provide a satisfactory rotating unit, especially at high speeds of rotation so a metallic helix 26 is added to support the flexible tube and provide a metal-to-metal bearing as the shaft revolves.

When the transmission is operated either shaft 22 or shaft 15 may be the driving member. Assuming that rotary power is applied to shaft 22, wheel 21 transmits a circular force or torque on bearing 20 and the cap 18, 17, bearing 16, and bent shaft 14 will all revolve. As shaft 14 turns, its bent portion also turns and revolves the inner race of bearing 16.

The outer race, attached to cap 17 and flexible tube 25 cannot make a complete revolution because of the permanent seal to the bearing support 11. Therefore the cap and outer portion of the tube move through a circular orbit but do not revolve with reference to an axis through the center of bearing 20.

Figure 2:
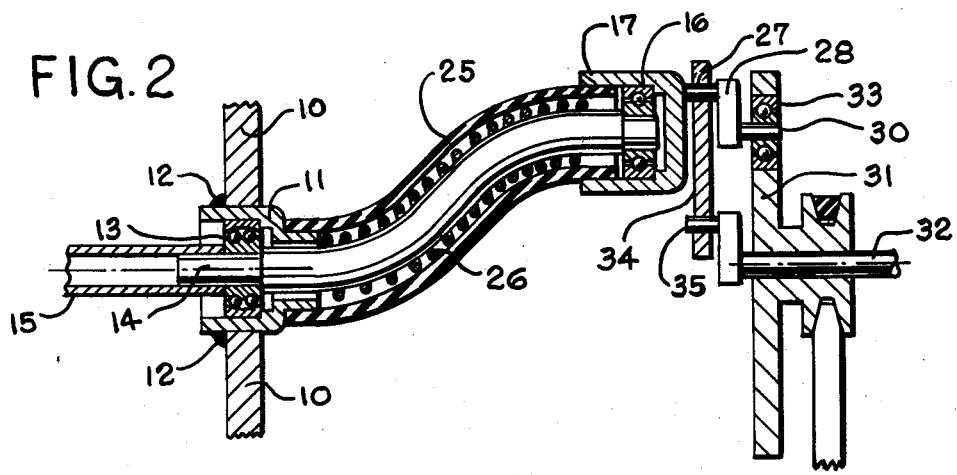
Fig. 2 is a side view, generally in section, showing another design of the transmission with a mechanism for keeping the flexible covering from turning on the bent shaft.

The arrangement shown in Fig. 2 is similar to the one shown in Fig. 1 except that the end portion of shaft 14 is bent into an S shape so that the portion within bearing 16 is parallel to the axis of rotation. Cap 17 is the same as in the previous illustration but it is also in parallel arrangement and has an eccentric stud 27 secured to the cap edge. A crank arm 28 and concentric stud complete the cap mechanism.

A rotatable wheel 31 which may be driven by a belt, is axially aligned with bearing 13 and revolves on a stationary shaft 32. The concentric stud 30 is held by a bearing 33 and in this arrangement the device operates in the same manner as the device shown in Fig. 1. It has been found in practice, however, that there is a slight tendency for the flexible tube to revolve on shaft 14 and this puts a strain on both end seals where the rubber is sealed to the metal. To reduce the strain and prevent the cap from revolving, a link 34 is coupled between the eccentric stud 27 and a similar eccentric stud 35 secured to the stationary shaft 32.

The operation of this form is the same as before. Cap 17 and its concentric stud 30 travel in a circular path when driving wheel 31 is turned. The link 34 revolves with stud 35 as its central bearing, always keeping the eccentric stud 27 at the top position.

From the above description it will be evident that the invention provides a pressuretight transmission capable of transmitting a large amount of rotary mechanical power without the possibility of a gas leak.

While there have been described and illustrated, specific embodiments of the invention, it will be obvious that various changes and modifications may be made therein without departing from the field of the invention which should be limited only by the scope of the appended claims.

I claim:
1. A pressuretight transmission for transmitting rotary motion from a driving member to a driven member within a pressure sealed enclosure comprising; a journalled shaft coupled to the driven member, one portion of which is bent out of line with the axis of rotation; a rubber tube for enclosing said bent portion, one end of which is pressure sealed to a wall of the enclosure; a metallic flexible helix mounted within the rubber tube for supporting the tube and providing a bearing for the shaft; a cap sealed to the other end of the rubber tube and containing a bearing for the end portion of the shaft; an eccentric stud on said cap; a stationary shaft mounted in alignment with the journalled shaft for rotatably holding the driving member, an eccentric stud on said stationary shaft; and a link coupling the two eccentric studs to keep the cap and the rubber tube in rotating alignment.

2. A pressuretight transmission for transmitting rotary motion from a driving member to a driven member within a pressure sealed enclosure comprising; a journalled shaft coupled to the driven member, one portion of which is bent out of line with the axis of rotation; a rubber tube for enclosing said bent portion, one end of which is pressure sealed to a wall of the enclosure; a metallic flexible helix mounted within the rubber tube for supporting the tube and providing a bearing for the shaft; a cap sealed to the other end of the rubber tube and containing a bearing for the end portion of the shaft; an eccentric stud on said cap; a stationary shaft mounted in alignment with the journalled shaft for rotatably holding a driving member; an eccentric stud on said stationary shaft, the eccentricity of which is equal to the eccentricity of the stud on the cap; and a link coupling the two eccentric studs to keep the cap and rubber tube in rotating alignment.

CARL BOSCH.

REFERENCES CITED

The following references are of record in the file of this patent:

UNITED STATES PATENTS

| Number | Name | Date |
|---|---|---|
| 429,611 | Facer | June 10, 1890 |
| 592,017 | McCauley et al. | Oct. 19, 1897 |
| 679,343 | Singer | July 30, 1901 |
| 1,436,444 | Holmes | Nov. 21, 1922 |
| 2,539,386 | Albert | Jan. 30, 1951 |

FOREIGN PATENTS

| Number | Country | Date |
|---|---|---|
| 6,254 | Germany | Dec. 13, 1878 |
| 128,376 | Great Britain | Jan. 16, 1919 |